April 28, 1942. J. G. CAMPBELL Re. 22,081
METHOD OF DETERMINING THE PETROLEUM OIL CONTENT OF EARTH SAMPLES
Original Filed Sept. 24, 1938
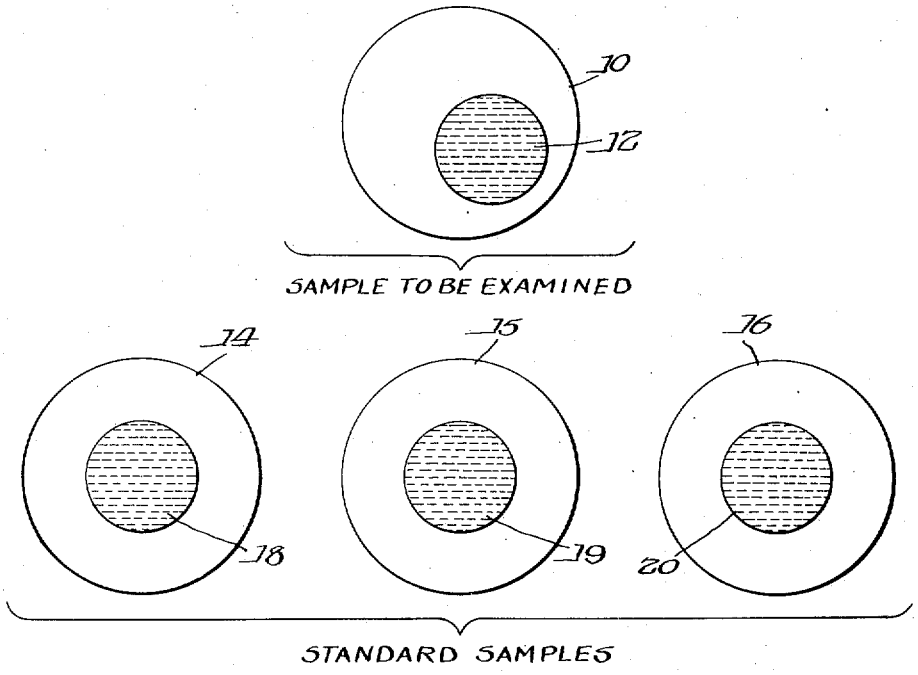
Inventor:
John G. Campbell:
By: Wilkinson Lackey Zinn & Knight
Attys.

Reissued Apr. 28, 1942

Re. 22,081

UNITED STATES PATENT OFFICE 22,081

METHOD OF DETERMINING THE PETROLEUM OIL CONTENT OF EARTH SAMPLES

John G. Campbell, Houston, Tex., assignor to Ralph H. Fash, trustee, Fort Worth, Tex.

Original No. 2,227,438, dated January 7, 1941, Serial No. 231,576, September 24, 1938. Application for reissue March 26, 1941, Serial No. 385,291

7 Claims. (Cl. 250—71)

The invention relates to a method for use in exploring for oil and has more particular reference to an improved method for logging the oil content of wells by the use of ultra-violet light and which will also find application in approximating the oil content of soil to detect oil seepages.

An object of the invention is to provide a method of exploring for subterranean petroleum oil deposits by analysis of earth samples.

Another object is to provide a method of exploring for petroleum oil by analyzing earth samples to determine their oil content and wherein the final result is a determination of the oil content of said earth samples on a quantitative basis.

In the process of drilling for oil and gas difficulty is encountered in determining whether a horizon which has been penetrated contains sufficient oil or gas to justify the expense of testing. Due to this uncertainty productive horizons have occasionally been passed up and the oil which could be produced from these horizons is lost. This passing up of productive horizons is particularly true of wells drilled by the rotary method, where the sealing action of the mud from the rotary fluid seals off productive horizons.

Until recent years the detection of productive oil horizons has been dependent upon determining the presence of oil in cores or cuttings and by observing the rainbow on the drilling fluid produced by oil from a horizon. More recently a system of electrical logging has been used to determine the presence or absence of productive horizons. This system depends upon determining the electrical resistivity of strata encountered in a well. In certain areas this method has not proved satisfactory and even in the areas where considerable success has been attained some uncertainty exists as to results. This system of electrical logging necessitates the stopping of the drilling operations in order to obtain a resistivity log of a well.

Another object of the present invention is to provide an improved method of logging the oil content of wells and detecting oil seepages and wherein the oil content of the cuttings from the well can be approximated without stopping the drilling operation.

As a result of the present method an approximation as to the oil content of the cuttings can be given within an hour after the cuttings are obtained from the well. Also it is possible to make the determinations at the well and to make the same more rapidly and more accurately than has been possible by any method heretofore used. It has been found in using the present method in actual well drilling operations that several hundred feet above the oil producing horizon there is a definite increase in the oil content of the strata. Therefore, ample notice is obtained of the approach of a productive horizon. Such an oil content log of a well enables more accurate correlation between wells than has heretofore been possible.

It is also possible with the present process to determine the near lateral presence of productive horizons. When the near presence of a productive horizon is indicated by the method of the invention, the absence of a producing zone in the well indicates that the producing zone is close and the drilling of another well would be desirable. This information can not be obtained by any method heretofore used. In such operations the fact that the oil content of the cuttings can be estimated several hundred feet before an oil horizon is encountered is of great value.

A more specific object of the invention resides in the provision of a method for extracting the petroleum oil content of an earth sample to concentrate the petroleum oil in the solvent whereby the oil content of said solvent and thus the earth sample may be quantitatively determined.

The figure of the drawing is illustrative of one preferred method coming within the invention.

The determination of the oil content of cuttings in accordance with the present method is based upon the fact that petroleum oil has a fluorescent appearance in ultra-violet light. By means of this fact it is possible to estimate very closely, in the manner to be presently described, the oil content of cuttings from wells during the drilling operations and which does not require the stopping of said operations.

The drill cuttings recovered directly from the well are first washed with water to remove the drilling mud and other extraneous materials, thereby obtaining an accurate specimen of the original strata. This is dried and then ground to approximately one hundred mesh fineness. A weighed quantity of the specimen is extracted, using ethyl ether or other suitable oil solvent. This extraction step may be performed by using any of the conventional extractors such as Soxhlet or Butt where the specimen is placed in a porous thimble and the hot solvent from the condenser extracts the same by a continuous process, or the weighed sample may be placed in a bottle or tube, a measured volume of solvent added, and then shaken vigorously for a definite period. In either case a convenient aliquot of the oil solvent containing the crude petroleum oil extracted from the sample is measured and then transferred quantitatively to fluorescent-free filter paper 10 or any other fluorescent-free absorbent material. Any non-fluorescent surface may be used on which to form a spot as indicated by numeral 12 in the drawing, but an absorbent one is preferred on account of speed and ease of handling. This step should be carefully performed, the object being to obtain a spot on the filter paper of uniform size so that all results can be compared with as little variation as possible. The transfer can be made quite rapidly and easily, using a dropping pipette where the dropping can be controlled, resulting in a spot of uniform size.

For comparison a set of standard samples of crude petroleum oil is prepared of known concentration, ranging preferably from .01 milligram to 1.00 milligram. These are made up in convenient strength stock solutions, using the same type of solvent and transferring to discs 14, 15, 16 etc. or the like of fluorescent-free absorbent material or other non-fluorescent surface to form spots 18, 192 and 20 respectively in the same precise manner as the extract from the drill cuttings.

The spot 12 prepared in accordance with the foregoing and containing the petroleum oil from the drill cuttings or other earth sample are matched against the standard solutions in the spots 18, 19 and 20 under ultra-violet light in a room free of visible light. In other words, a comparison is made of the fluorescence of the unknown solution or spot 12 with the fluorescence of the standard solutions or spots 18, 19 and 20, wherein the oil content is known. Since the fluorescence of the solutions will vary in intensity in direct proportion to the oil content thereof, it is possible to record the quantity of petroleum oil in spot 12 as that of the standard spot having approximately the same fluorescence. The oil content of the extract containing the petroleum oil from the sample having been determined, it is possible to apply the result directly to the earth sample since a weighed quantity was extracted. The final result will be a determination of the oil content of the earth sample on a quantitative basis. To facilitate interpretation of the results the same may be plotted graphically using the depth of the well as one coordinate.

In those instances where it is not desired to obtain accurate records of the oil content of the various strata encountered, such as would result by following the above procedure, it is possible to detect the penetration of an oil bearing horizon by means of the fluid entering the well and that leaving the well. The method followed requires that the drilling fluid discharged be examined under ultra-violet light and compared with the drilling fluid entering the well. An increase in the fluorescence of the drilling fluid from the well indicates the penetration of an oil bearing zone.

It is essential for precise work that all visible light as far as practicable be filtered out from the source of ultra-violet rays. Violet ray equipment which has been found satisfactory for purposes of the present invention is standard equipment that can be purchased on the open market. While this equipment has proved to be a good source of ultra-violet rays, it has also produced considerable visible rays, most of which can be filtered out by using suitable filters, such as Corex No. 586 or 587.

Due to the fading effect of continued or prolonged ultra-violet ray exposure on hydrocarbons, it is necessary to renew the standards at regular intervals to maintain precision and accuracy in the present method.

In the exploration for oil it has been common practice for years to use oil seepages as guides. Said seepages occur along faults and crevices, and are detected by visual observation. However, oil seepages which can not be detected by visual observation can be found by the present method when applied to determining the approximate oil content of earth samples. The same procedure is followed as outlined above and ultra-violet light is used in comparing the samples with a set of standard samples. For more rapid work where, however, the results obtained will be accurate for all practical purposes, the solution of oil obtained by extracting the drill cuttings or by extracting the earth samples in the case of detecting petroleum oil seepages may be compared directly under ultra-violet light with solutions of known quantities of petroleum oil. The intensity of the fluorescence of the extract containing the oil from the earth sample is thus matched with that of the known solutions and thus an approximation of the oil content is obtained.

There are many minerals which have a fluorescent appearance under ultra-violet light and also many sea shells fluoresce when subjected to ultra-violet light. If any of these are present in the cores, cuttings or earth samples, erroneous oil contents would be obtained by subjecting the sample directly to the ultra-violet rays. Since the present method depends upon the fluorescent appearance of the extract from cores, cuttings or other earth samples, erroneous results due to the presence of fluorescent minerals, shells and the like in the samples are thus eliminated. It is also possible with the present method to concentrate the petroleum oil of an earth sample in a clear liquid that can be penetrated by the ultra-violet rays to therefore cause each particle of oil in solution to fluoresce. The intensity of the fluorescent effect is the summation of the fluorescence of all the oil extracted from the sample analyzed. The results obtained by comparison with standard samples are therefore an accurate determination of the oil content of the earth sample. The present method of using extracts from the earth samples renders it possible to determine quantitatively smaller amounts of petroleum oil than it was heretofore possible to determine qualitatively.

The invention as hereinabove set forth may be variously embodied within the scope of the following claims.

What is claimed is:

1. The method of determining the oil content of earth samples which consists in preparing a series of spots of relatively uniform size of standard samples of oil of known concentration but which differ in oil content, preparing a spot of substantially the same size from oil extracted from an earth sample and wherein the concentration is unknown, comparing said latter spot under ultra-violet light with said standard spots and noting the fluorescence, and then computing the oil content of the spot prepared from oil extracted from the earth sample on the basis of the known concentration of the particular standard spot having approximately the same fluorescence.

2. The method of determining the oil content of cuttings from wells which consists in extracting from a specimen of the cutting a measured sample of oil, transferring the same quantitatively to fluorescent-free absorbent paper to obtain a spot on said paper, preparing a series of spots also on fluorescent-free absorbent paper of standard samples of oil of known concentration but which progressively differ in oil content and which are of the same size and prepared in the same precise manner as the spot of oil extracted from the cutting, comparing the spot extracted from the cutting under ultra-violet light with the said standard spots and noting the fluorescence, and then computing the oil content of the said spot extracted from the cutting on the basis of the known concentration of the particular standard spot having approximately the same fluorescence.

3. The method of logging the oil content of a well, which consists in preparing a series of standard solutions of petroleum oil with a solvent, the standard solutions progressively increasing in oil content from minimum to maximum concentration and wherein the said petroleum oil concentration of each is known, extracting samples of oil by the use of the same solvent from earth samples taken from the various strata encountered in the drilling of a well, comparing each of the latter samples of oil under ultra-violet light with the standard solutions and noting the fluorescence, and then computing the oil content of the said latter samples on the basis of the known concentration of the particular standard solution having substantially the same fluorescence.

4. The method of logging the oil content of earth samples, which consists in preparing a series of standard solutions of petroleum oil with a solvent, the standard solutions progressively increasing in oil content from minimum to maximum concentration and wherein the said petroleum oil concentration of each is known, extracting samples of oil from earth samples taken from the various strata and preparing solutions of the same in substantially the same manner as for the standard solutions, the petroleum oil concentration of the solutions from the various strata being unknown, subjecting each of the unknown solutions from the various strata to ultra-violet light so that a comparison may be made of the fluorescence of the same with the fluorescence of the standard solutions of known concentration, and recording the petroleum oil concentration for each of the unknown solutions so compared, the said recording being based on the premise that the oil concentration of an unknown solution will approximate the oil concentration of the particular standard solution having substantially the same fluorescence.

5. The method of logging the oil content of a well, which consists in preparing a series of standard solutions of petroleum oil with a solvent and wherein the petroleum oil concentration of each is known, ranging approximately from .01 milligram to 1.00 milligram, extracting samples of oil from earth samples taken from the various strata encountered in the drilling of the well and preparing solutions of the same in substantially the same manner as for standard solutions, the petroleum oil concentration of the solutions from the various strata being unknown, subjecting each of the unknown solutions from the various strata to ultra-violet light and noting the fluorescence of the same, comparing the fluorescence of the said unknown solution with the fluorescence of the standard solutions of known concentration, and recording the petroleum oil concentration for each of the solutions so compared, the said recording being based on the premise that the oil concentration of an unknown solution will approximate the oil concentration of the particular standard solution having substantially the same fluorescence.

6. The method of exploring for subterranean petroleum oil deposits by analysis of earth samples to determine the oil content thereof, which consists in the steps of collecting earth samples, drying each sample, subjecting a measured quantity of each dried sample to treatment by a measured quantity of an oil solvent to extract from the said sample any petroleum oil contained therein, subjecting the oil solvent following the extraction step to ultra-violet light to cause the oil content thereof to fluoresce, noting the intensity of the fluorescent effect, and determining the oil content of said solvent and thus its respective earth sample on the basis that the intensity of the fluorescent effect will vary in direct proportion to the oil content thereof.

7. The method of exploring for subterranean oil deposits by analysis of earth samples, which consists in preparing a measured quantity of each sample, subjecting each measured sample to treatment by a measured quantity of a fluid to extract from said sample the petroleum oil contained therein, subjecting the fluid following each extraction step to ultra-violet light to produce a fluorescent effect by the action of the ultra-violet light on the petroleum oil in the fluid, noting the intensity of the fluorescent effect, and determining the petroleum oil content of the fluid and thus its respective earth sample on the basis that the intensity of the fluorescent effect will be in direct proportion to the oil content.

JOHN G. CAMPBELL.